United States Patent [19]

Papa et al.

[11] 4,248,776
[45] Feb. 3, 1981

[54] SYMMETRICAL TRISAZO DYE OBTAINED BY COUPLING TETRAZOTIZED 4-4'-DIAMINOZOBENZENE WITH 2-CARBOXYMETHYLAMIN0-8-NAPHTHOL-6-SULPHONIC ACID

[75] Inventors: Sisto S. Papa, Milan; Renzo Ferrario, Ceriano Laghetto, both of Italy

[73] Assignee: Aziende Colori Nazionali Affini Acna S.p.A., Milan, Italy

[21] Appl. No.: 33,225

[22] Filed: Apr. 25, 1979

[30] Foreign Application Priority Data

Apr. 28, 1978 [IT] Italy .................... 22790 A/78

[51] Int. Cl.$^3$ ............... C09B 35/36; C09B 35/38; D06P 3/24; D06P 3/32
[52] U.S. Cl. ........................... 260/173; 260/169
[58] Field of Search .................... 260/173, 169

[56] References Cited

U.S. PATENT DOCUMENTS 3,928,313  12/1975  Papa et al. .................... 260/173

OTHER PUBLICATIONS

Color Index, 3rd Edition, vol. 4, p. 4286, #30260, (1971).

Cassella, Chemical Abstracts, vol. 65, #9064f, (1966).
Color Index, 3rd Ed., vol. 4, pp. 4292 to 4295, CI's 31515, 31545, 31580 and 31610, (1971).

*Primary Examiner*—Floyd D. Higel
*Attorney, Agent, or Firm*—Morgan, Finnegan, Pine, Foley & Lee

[57] ABSTRACT

The present invention concerns a new acid trisazo dye suited for the dyeing of natural and synthetic polyamidic fibres and particularly for the dyeing of leather. The dye has the following structural formula:

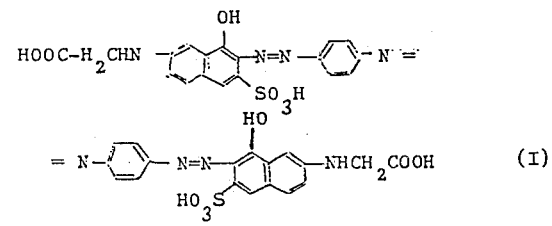

and dyes in a full black shade. The present invention also includes a process for the preparation of dye (I) and comprises tetrazotizing 4-4' diaminoazobenzene and then coupling the tetrazo-compound thus formed with 2 molecules of 2-carboxymethylamino-8-naphtol-6-sulphonic acid (carboxy methyl-gamma acid) in an alkaline medium.

1 Claim, No Drawings

SYMMETRICAL TRISAZO DYE OBTAINED BY COUPLING TETRAZOTIZED 4-4'-DIAMINOZOBENZENE WITH 2-CARBOXYMETHYLAMIN0-8-NAPHTHOL-6-SULPHONIC ACID

BACKGROUND OF THE INVENTION

Prior to the present invention it was known that benzidinic dyes provide a black shade (see Acid Black 69, C.I. 30.260). While these dyes are satisfactory from a dyeing point of view they have the attendant disadvantage of requiring very strict safety measures since in their preparation they require the use of dangerous aromatic diamine benzidine.

OBJECTS OF THE INVENTION

An object of this invention is to provide a novel black dye that is suited for the dyeing of natural and synthetic polyamidic fibres and particularly for the dyeing of leather.

Another object of this invention is to provide a novel black dye which is particularly suitable for applications which require a successive "re-tanning" of the substrate.

A still further object of this invention is to provide a novel black dye that dyes leather in a reddish black shade of good penetration and which shows good general fastnesses.

Yet a further object of the invention is to provide a novel process for the production of a black dye having the desirable properties set forth in the foregoing objects but which in the preparation of said dye advantageously avoids the use of the dangerous aromatic diamine benzidine.

GENERAL DESCRIPTION OF THE INVENTION

It has been found that the objects of this invention may be realized by providing a new acid trisazo dye suited for the dyeing of natural and synthetic polyamidic fibres and particularly for the dyeing of leather as well as providing a process for its preparation.

The dye has the following structural formula:

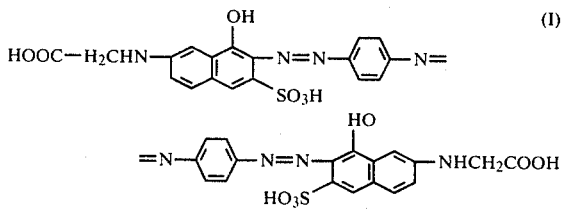

and dyes in a full black shade.

The novel dye of this invention may be prepared by providing a process for the preparation of dye (I) comprising tetrazatizing 4-4'-diamino-azobenzene and then coupling the tetrazo-compound thus formed with 2 molecules of 2-carboxymethylamino-8-naphtol-6-sulphonic acid (carboxyl-methyl-gamma acid) in an alkaline medium.

The dye of this invention dyes leather in a reddish black shade of good penetration and showing good general fastnesses. It is particularly suited for those applications which require a successive "re-tanning" of the substrate.

In comparison with the benzidinic dyes of the same shade (Acid Black 69, C.I. 30 260), this invention offers very important advantages from the point of view of strict hygenical protection of the working environment where the dye is prepared, in an much as it allows to avoid the use of the dangerous aromatic diamine benzidine, which would at any rate require very strict safety measures.

SPECIFIC DESCRIPTION OF THE INVENTION

The following example is given to further illustrate the invention without in any way limiting its broader aspects. Parts and percentages are given by weight, unless otherwise indicated.

EXAMPLE (A) Preparation of the testrazo-derivative 21.1 parts of diamino-azo-benzene were suspended in 200 parts of water and 46.5 parts of hydrochloric acid of 20° Be.

This suspension was submitted to stirring for 15 minutes and, after cooling down with ice at +5° C., it was tetrazotized with 14 parts of sodium nitrite dissolved in 60 parts of water. The temperature was kept at 5°–7° C. by the addition of further ice.

Thereupon the suspension was stirred for 30 minutes in the presence of nitrous acid. It was then clarified by removal of its impurities and the excess of nitrous acid was eliminated with sulphamic acid (end volume: about 1200 ml).

(B) Preparation of "Carboxy-methyl-gamma"

In a separate vessel there were suspended in 200 parts of water, at 70° C., 47.6 parts of gamma acid and were then brought to solution with 26.6 parts of caustic soda at a pH value of abt. 7 (temp. 45°–50°C.). To this solution were then admixed in 10 minutes, 42 parts of monochloro-acetic acid. The mass precipitates in a thick pasty substance. Thereupon the pH was corrected to about value 6 by pouring into the mass in 15 minutes 58 parts of 36° Be caustic soda. The temperature rose spontaneously to 55° C. the whole mass passing into solution. This solution was then heated externally up to 94°–96° C. in 1 hour and then it was maintained at said temperature for 4 hours.

During the heating up to 94°–96° C., and for the whole period foreseen for the heating at 94°–96° C., the pH was maintained at around 6 by the addition of further 32 parts of 36° Be caustic soda.

At the end of the 4 hour period at 94°–96° C., the solution was allowed to cool down to room temperature (vol.=abt. 360 ml).

The tetrazo, after correction of its pH to about 9 with 13.5 parts of 36° Be caustic soda, in 1 hour was poured over the coupler brought to 2°–5° C. by the help of ice. During the pouring, the pH value was maintained between 8 and 8.5 by the addition of 14.5 parts of sodium carbonate brought to solution in 60 parts of water. Once the pouring was completed, the mixture was stirred for 1 hour until complete disappearance of the tetrazo. Thereby was obtained an unfilterable black mass (vol.=1700) which was separated by spray-drying. There were obtained 110 parts of a dry product which dyes leather in a black shade with a good affinity and penetration. It proved particularly suited for dyeing 're-tanned' leather, and it showed a good fastness to light and washings.
We claim:
1. Trisazo dye having the following formula:
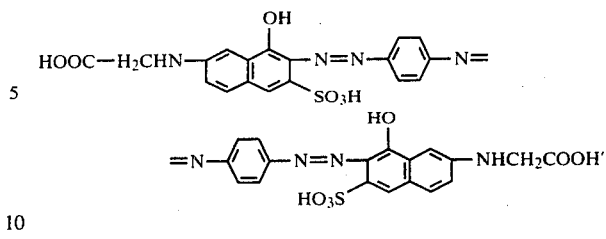

(C) Coupling